Dec. 17, 1968     S. HELLER ETAL     3,417,269
POSITIONING SYSTEM WITH GAS BEARING MOVING COIL
Filed Dec. 15, 1965     2 Sheets-Sheet 2

3,417,269
POSITIONING SYSTEM WITH GAS BEARING
MOVING COIL
Stanley Heller, Philadelphia, Pa., William F. Anderson,
Peekskill, and Robert B. Berlin, Yorktown Heights,
N.Y., assignors to Itek Corporation, Lexington, Mass.,
a corporation of Delaware
Filed Dec. 15, 1965, Ser. No. 523,821
8 Claims. (Cl. 310—27)

ABSTRACT OF THE DISCLOSURE

The disclosure is drawn to a frictionless precision positioning system for the relative motion of two or more mechanical devices on a single axis in a single plane. The devices are separated and constrained by bearing surfaces lubricated by a film of gas under pressure.

---

This invention relates to frictionless positioning systems for precision apparatus, and particularly to precision positioning systems which must operate for movement along a single axis while positioned in a single plane.

In some precision instruments and apparatus, it is essential to provide a precision positioning system or device which is capable of very rapid linear adjustment movements. Such movements may have a very small amplitude. Furthermore, it is often required that the attitude and alignment of the device with respect to the axis of movement must be maintained very accurately.

Accordingly, it is an object of the present invention to provide a positioning device which has virtually no static friction, which is movable on a single axis at very high accelerations, while maintaining an accurately fixed attitude and alignment with respect to the axis of movement.

It is another object of the invention to provide a precision positioning system in which the movable portions have a very low inertia in order to promote rapid movement.

It is another object of the present invention to provide a precision positioning device which is particularly characterized by its simplicity of construction and maintenance-free operation.

Prior attempts at the reduction of friction have usually involved the use of liquid lubricants or semi-solid lubricants such as oils and greases. Such lubricants possess a number of serious disadvantages. For once, provisions must be made to contain the lubricant. This can be a serious problem in instruments, such as optical apparatus, in which materials such as oils or greases cannot be tolerated in or near the optical parts because they destroy the desired optical properties.

Accordingly, it is another object of the present invention to provide a precision positioning apparatus which is essentially frictionless in its operation, and which does not require liquid or semi-liquid lubricants.

In some prior apparatus intended for purposes similar to the purpose of the present apparatus, in which frictionless motion along a single axis and in a single plane is required, some of the constraints upon the motion of the positioning apparatus have been provided by means of very flexible mechanical members. These members may be metallic diaphragms having concentric convolutions, or the like, to promote flexibility. However, such mechanical members are eventually subject to fatigue failures, and furthermore, they inherently limit the distance of travel of the positioning system, and also add a spring force which opposes movement of the positioning system, thus increasing the energy input requirements.

Accordingly, it is another object of the present invention to provide a precision positioning system which does not require the use of mechanical spring elements, and which is properly constrained in the desired attitude and path of travel without the necessity for such spring elements.

Another object of the invention is to provide a precision positioning system which is essentially frictionless in its operation and which is particularly adapted for movement in response to electromagnetic forces.

Another object of the present invention is to provide a positioning system which is capable of very rapid response, and which is particularly well adapted for optical systems for reading photographically recorded data.

In carrying out the above objects of this invention, in one preferred embodiment of the invention, there may be provided a positioning system comprising an arm member and a first support member, one of these members being an outer member, and the other one being an inner member. The outer member comprises a cup portion telescopically fitted and positioned for relative reciprocation over the inner members. The mechanical connection between the inner and outer members during operation of the system consists of a film of pressurized gas. One of these members includes gas release openings spaced apart along the direction of reciprocation and spaced around the circumference of the telescopically fitted portion thereof for the introduction of gas under pressure into the space between the telescopically fitted portions of the members to form the film of pressurized gas.

Further features, objects, and advantages of the present invention will be apparent from the following description and the accompanying drawings.

Figure 2:
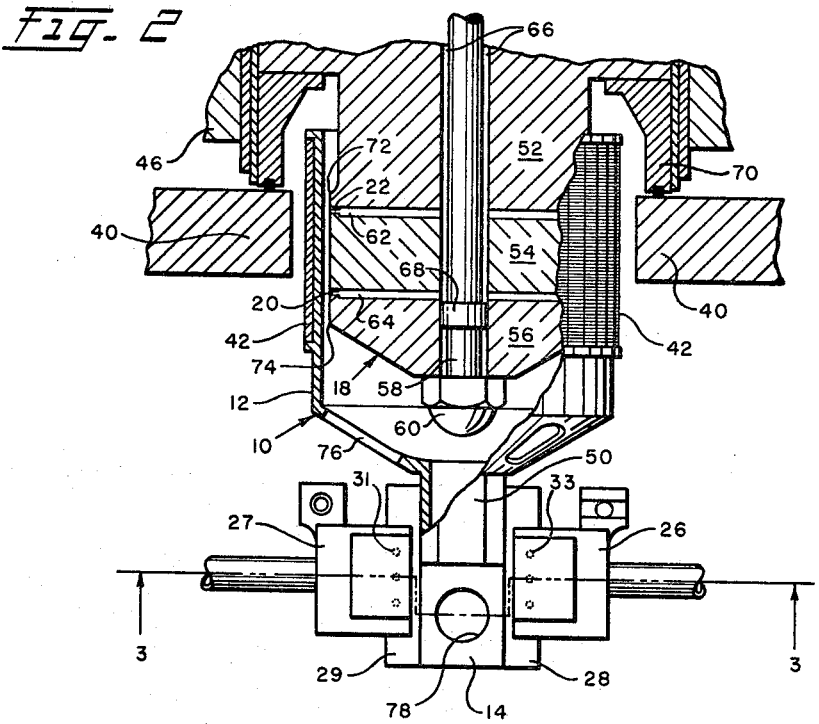
FIG. 2 is a top view, partly in section, illustrating an enlarged detail of precise details of structure for the embodiment of FIG. 1.
Figure 3:
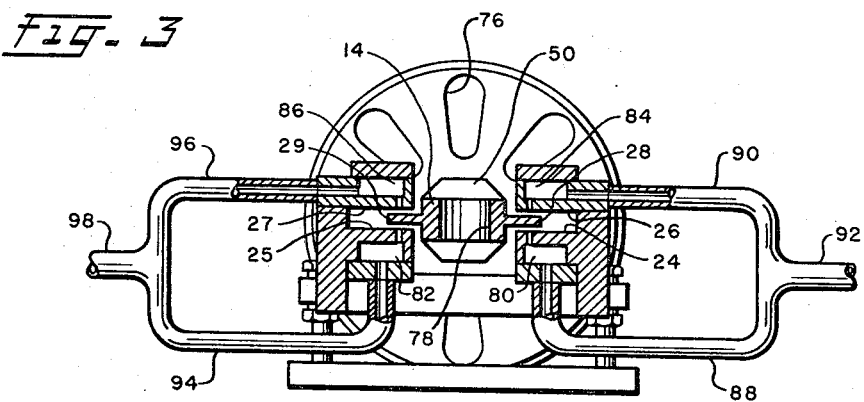

And FIG. 3 is a front view, at the same enlarged scale as FIG. 2 and taken at section 3–3 of FIG. 2.

Figure 1:
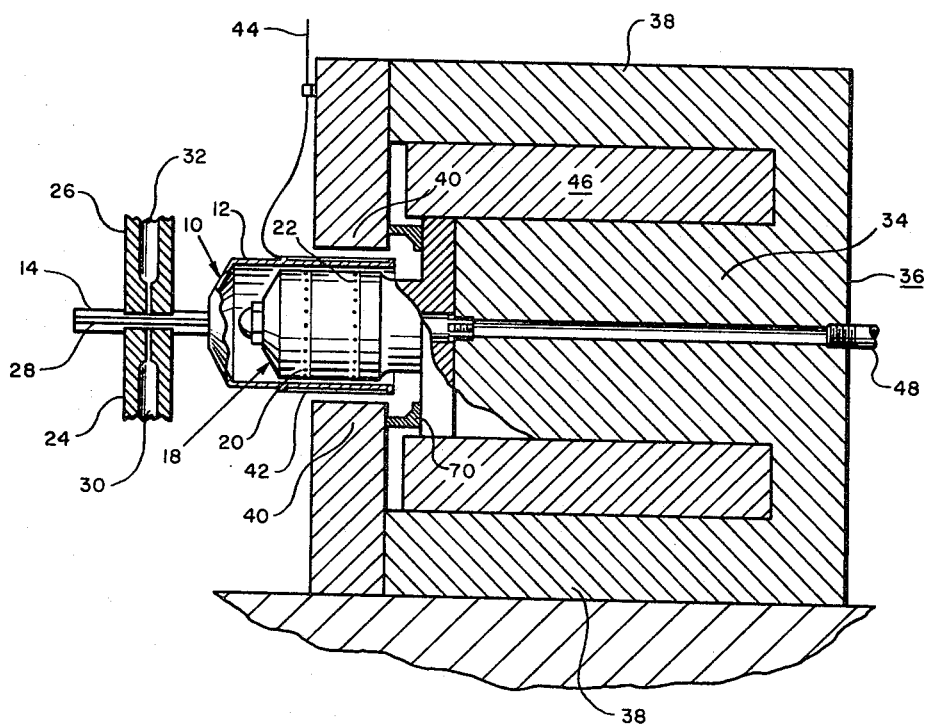
FIG. 1 is an idealized side view, partly in section, of a preferred embodiment of the invention.

Referring more particularly to FIG. 1, there is shown a reciprocable cantilever arm member 10 having a cup portion 12 and a stem portion 14. The outer left end of the stem portion 14 may be adapted to support a device to be positioned, such as a small optical lens (not illustrated).

The arm member 10 is supported at the cup portion 12 by means of a first support member generally indicated at 18. Member 18 is a fixed cylindrical member having a rather close fit with the inside cylindrical diameter of the cup portion 12. Support member 18 is provided with two axially spaced circumferential rows of openings 20 and 22 through which a gas, such as air, is supplied to the limited space between the outer surface of support member 18 and the inner surface of the cup portion 12. The gas introduced from the two rows of holes 20 and 22 forms a lubricant for the cup portion 12 and prevents any rubbing contact upon the support 18. Because the gas is introduced at two axially spaced positions, the lubrication pressure is quite uniform beneath the cup portion 12, and the arm 10 is thus supported in a manner which is quite resistant to any misalignment forces perpendicular to its axis, while at the same time permitting free and frictionless movement in an axial direction.

The stem portion 14 is preferably also supported and constrained by gas pressure lubricated bearings at a second support member including a lower bearing 24 and an upper bearing 26, each of which cooperate with a fin 28 which is attached to the side of the stem portion 14. A similar fin is provided on the opposite side of the stem portion 14, and the second support member includes bearings similar to 24 and 26 in cooperation therewith.

These components are hidden in FIG. 1, but are illustrated in more detail in FIGS. 2 and 3.

As illustrated in FIG. 1, the bearings 24 and 26 each include passages (30, 32) for gas under pressure which terminate in orifice openings adjacent to fin 28 for providing air film lubrication and support at the fin. The support for the fin 28, and its counterpart hidden on the other side of the stem 14, provide for precise horizontal positioning of the stem 14 while permitting unrestrained reciprocation movement of the entire arm 10. The bearings 24 and 26 for the fin 28, and its hidden counterpart on the other side of stem 14 also prevent any rotation of the arm 10.

The controlling forces positioning the arm 10 at various axial positions may be electromagnetic forces. For this purpose, the support 18 may be a magnetic pole piece which forms a part of a center pole 34 of a stationary magnetic structure 36. The outer portions 38 of structure 36 also form a part of the magnetic circuit which terminates with an annular pole piece 40 surrounding, and froming an air gap with the support pole piece 18. The cup portion 12 is partially positioned within this air gap, and an electromagnetic winding 42 is wound around the outer surface of the cup portion 12 and supplied with control current through leads 44.

The field provided by the stationary magnetic structure 36 is a unidirectional magnetic field. Accordingly, a permanent magnetic structure may be employed. However, a direct current winding 46 is preferably employed to provide a high field strength. If the current provided through leads 44 to the arm member winding 42 is in the direction to provide a magnetic field which coincides with the direction of the magnetic field through the central magnetic member 34 and the support 18, then the entire arm 10 is biased to the right in FIG. 1 by the resultant magnetic force. However, if the current in winding 42 is in the opposite direction, then the resultant electromagnetic force is one of repulsion, and the resultant movement is to the left in FIG. 1. The currents in winding 42 may vary and reverse rapidly, and the arm 10 rapidly responds in physical movement.

The gas under pressure for the lubrication of support 18 may preferably be supplied to the two rows of orifice openings 20 and 22 from a gas input connection shown at 48.

FIG. 2 is an enlarged sectional top view of a portion of the apparatus and illustrating precise details for the structure of FIG. 1. It particularly pictures the portion including the arm member 10 and the parts immediately associated therewith. The fin 29, which was hidden in FIG. 1, (corresponding to fin 28) is illustrated together with an upper bearing 27 for the fin 29. The corresponding lower bearing is designated 25 and shown in FIG. 3. Each of the bearings 24 to 27 is provided with an air pressure manifold with two or three air jet orifices as illustrated in dotted form at 31 and 33 in FIG. 2. These orifices provide for distribution of pressurized gas on both surfaces of each of the fins 28 and 29 at each of the bearings 24 to 27.

As illustrated in FIG. 2, the stem portion 14 of the arm 10 is preferably provided with a reinforcement 50 which may take the form of an octagonal cross-section tube extending approximately half of the length of the stem portion. This reinforcement 50 is omitted in the idealized showing of FIG. 1 for greater clarity.

In FIG. 2, the support 18 has been shown in section. It consists of a pole piece spacer member 52 and orifice plates 54 and 56 which are held in assembled relationship over a bolt 58 by means of a nut 60. The orifice plates 54 and 56 are each provided with radial passages respectively indicated at 62 and 64 which serve as part of an air supply manifold to provide air to the orifices 20 and 22. The orifices 20 and 22 are small holes which are drilled radially inwardly from the outer cylindrical surfaces of the orifice plates 56 and 54 into communication with the radial passages 64 and 62. The gas under pressure is preferably provided to the manifold passages 62 and 64 through clearance passages around the center bolt 58 which are indicated at 66. The bolt 58 preferably includes a close fitting collar portion 68 which closes off the center hole of the orifice plate 56 at a point just beyond the manifold passages 64. Thus, the gas under pressure is essentially sealed off from being expelled at the nut 60.

A non-magnetic and generally cylindrical spacer member 70 is provided between the toroidal pole piece 40 and the spacer member 52 of the pole piece 18. This does not "short circuit" the magnetic air gap between the toroidal pole piece 40 and the pole piece 18. The winding 42 upon the cup portion 12 preferably consists of many turns of very fine wire arranged in a flat configuration of several layers.

The air pressure lubrication provided between the outer surface of the pole piece support 18 and the inner surface of the cup portion 12 is restricted to an axial dimension between a point indicated at 72, where an undercut of the spacer member 52 commences, and a point 74, where the tapered end of orifice plate 56 begins. The air under pressure which is confined in this air lubrication zone is expelled from the lubrication zone at these points. The air expelled at 72 is relieved around the open end of the cup portion 12 and through the portion of the air gap between the toroidal pole piece 40 and the winding 42. The "closed" end of the cup 12 is provided with ventilation openings, as indicated at 76, for the relief of air ejected from the air pressure lubrication zone at 74.

By carefully restricting the axial dimension between points 72 and 74, by providing the two circumferential rows 20 and 22 of air pressure orifices, and by restricting the radial clearance space between the outer surface of the support pole piece 18 and the inner surface of cup portion 12 to approximately 0.001 of an inch or less, very effective lubrication is achieved with a minimum of air volume. Furthermore, a high degree of lateral stability of support is imparted to the arm member 10 so as to resist any forces tending to place it in misalignment with the axis of support 18.

In an actual physical embodiment, a very successful structure was provided in which the nominal clearance, in terms of the specified physical tolerances, was between 0.00075 inch and 0.00085 inch, as a radial clearance between the outer radius of pole piece 18 and the inner surface of the cup portion 12.

In order to enhance the lateral stability of the support, the two rows 20 and 22 of orifices are preferably spaced respectively near the edges of the pressure lubrication zone at 74 and 72. This assures the presence of a film of air under pressure at both ends of the pressure lubrication zone even under conditions where a slight misalignment of the cup portion 12 exists. In an actual physical embodiment, very acceptable results have been achieved with a pressure lubrication zone having an axial length between points 72 and 74 of approximately one and one half inchs and in which the distance from the orifices 22 to the point 72 is approximately one quarter inch, and the distance from orifices 20 to point 74 is also one quarter inch. Since there is no relief for the air pressure in the portion of the pressure lubrication zone between orifices 20 and 22, this portion of the zone is under an essentially constant pressure during operation of the apparatus.

The device to be positioned, such as an optical lens, may be supported in the stem portion 14 of the arm, such as within an opening indicated at 78.

FIG. 3 is a sectional front view taken at section 3—3 in FIG. 2, and particularly illustrating the details of construction of the fins 28 and 29, and the air bearing support associated therewith. At each of the bearings 24, 25, 26 and 27, there are respectively provided air pressure manifold chambers 80, 82, 84 and 86. Chambers 80 and 84 are supplied with air under pressure through tubes 88 and 90 from a common supply tube 92. Similarly, chambers 82 and 86 are supplied with air under pressure through tubes 94 and 96 from a common supply tube 98.

As indicated from the FIG. 3 drawing the air pressure film lubrication at fins 28 and 29 is limited to the zones in which the upper and lower horizontal surfaces of the fins 28 and 29 overlap with the adjacent horizontal surfaces of the respective bearings 24–27. The space at the lateral edges of the fins in the "throat" of the bearing structure between the embracing surfaces (such as 25 and 27) is quite large so as to provide relief for the air under pressure. Relief is also provided at the base of each of the fins 28 and 29 in the space between the body of the stem 14 and the bodies of the support structure at the bearings 24–27. During operation, the clearance space in the air pressure lubrication zone at each of the bearings 24–27, between each bearing surface and the adjacent surface of the fin, is in the order of one thousandth of an inch. In an actual physical embodiment, a very successful structure was provided in which the nominal clearance in terms of physical tolerances was between 0.00075 inch and 0.00095 inch.

The support and positioning effect achieved by the fins and the associated bearing surfaces provide two important functions. One is to provide a precise, predetermined and fixed rotational positioning of the arm member 10, no matter what the axial position of the arm may be. Since the cup portion 12 is cylindrical, the bearing support provided at the support 18 obviously does not provide for rotational positioning of the arm.

The other function of the bearings at the fins 28 and 29 is to provide additional stability and support for the arm member 10 in the vertical direction. This is important because of the dynamic loading caused by the overhung mass of stem 14. However, a more important reason for providing absolute stability and dimensional accuracy in the vertical direction is associated with the use of the apparatus for positioning an optical focusing element such as a lens. For this purpose, the lens must be accurately maintained in position in order to provide consistent focus.

Because of the air pressure lubrication which is constantly employed during operation of the apparatus of this invention, the arm 10 is always completely supported upon air films, no portion of the arm 10 being in physical contact with any solid supporting member, the entire support being accomplished through a film of gas under pressure. This provides a support system which is essentially free from any static friction. Accordingly, there is no tendency whatsoever for the arm to "stick" in any particular position, or to have any resistance to movement in response to the electromagnetic actuating forces which are present on account of the winding 42.

It is another interesting feature of the invention that the structure of the arm 10 is composed entirely of these shell-like sections. Thus, the mass of the arm is maintained at an absolute minimum to provide for very rapid physical movements. For instance, in one physical embodiment which has a configuration similar to the embodiment illustrated in FIGS. 2 and 3, the arm is capable of achieving physical movements at frequencies in the "audio" frequency range up to approximately five thousand cycles per second at a phase lag from the exciting signal on winding 42 which is of substantially constant value. A typical frequency and acceleration condition which this embodiment satisfies reliably is an oscillation at one hundred fifty cycles per second at a peak to peak amplitude of 0.050 inch. At the frequency of one hundred fifty cycles per second, the device is usually capable of amplitudes of oscillation of several times the amplitude just given. As the frequency is increased, the amplitude capability decreases. Generally speaking, each time the frequency is doubled, the maximum amplitude capability is approximately halved.

It will be seen that the objects set forth above, and others made apparent from the description, are efficiently attained. Since certain changes may be made in carrying out the constructions set forth without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

We claim:

1. A positioning system comprising a cantilever device reciprocably positionable and restrained from rotation, said device comprising:
   (A) an arm member and a first support member,
      (1) each of said members having portions which are elongated in the direction of reciprocation and with substantially uniform cross-sectional profiles, said arm member including at least two auxiliary bearing surfaces laterally positioned on opposite sides of the center line of said arm member and spaced away from said uniform profile portion thereof in the direction of reciprocation,
         (a) the uniform profile of one of said members being an outside profile and the uniform profile of the other one of said members being an inside profile,
         (b) said profiles being of substantially similar shape,
      (2) said uniform profile portions of said members being arranged in telescopic relationship,
      (3) one of said members including gas pressure manifolds formed therein, and
         (a) at least two circumferential rows of openings spaced along said direction of reciprocation from said uniform profile surface of said last-named member and in communication with said gas pressure manifolds for the introduction of gas under pressure into the space between said telescopic uniform profile surfaces to provide for gas presure lubrication therebetween, and
   (B) a second support member including substantially horizontal surfaces positioned beneath said laterally spaced surfaces of said arm member,
      (1) said second support member including pressure gas manifolds therein, and
      (2) said second support member including restricted passages from said manifolds through said surfaces thereof to provide for gas pressure lubrication between said surfaces and said auxiliary bearing surfaces of said arm member.

2. A positioning system in accordance with claim 1 in which
   (A) said arm member includes a second pair of auxiliary bearing surfaces,
      (1) each of said second pair of auxiliary bearing surfaces being arranged in a substantially horizontal plane and facing upwardly,
   (B) said second support member including a second pair of bearing surfaces positioned above said second auxiliary pair of bearing surfaces of said arm member, and
      (1) said second pair of bearing surfaces including gas pressure openings and supply manifolds connected thereto to provide for gas pressure lubrication with said second auxiliary pair of bearing surfaces.

3. A positioning system comprising
   (A) an arm member and a first support member,
      (1) one of said members being an outer member and the other one of said members being an inner member, (2) said outer member comprising a cup portion telescopically fitted and positioned for relative reciprocation over the other one of said members, (3) the mechanical connection between said members during operation of the system consisting of a film of pressurized gas, (4) one of said members including at least two rows of gas release openings spaced apart along said direction of reciprocation, (a) each of said rows being arranged around a circumference of the telescopically fitted portion of said member for the introduction of gas under pressure into the space between the telescopically fitted portions of said members to comprise said film of pressurized gas, (5) said arm member including a stem portion having stabilizing fins protruding from each side thereof, (B) a second support member including bearing surfaces embracing said fins, and (1) gas release openings within said last-mentioned bearing surfaces for providing pressurized gas supporting and positioning films on both sides of each of said fins.

4. A precision positioning device comprising
(A) a cantilever arm member having a cup portion and a stem portion extending away from the closed end of said cup portion,
(B) a first support comprising a cylindrical magnetic pole piece,
(C) the outer diameter of said pole piece and the inner diameter of said cup portion of said arm member being precisely dimensioned and telescopically fitted together,
(1) said pole piece including at least two axially spaced circumferential rows of orifices and manifolds connected to supply air through said orifices under pressure as a lubricant between said pole piece and said cup portion,
(a) said lubricant being operable to maintain stability in the alignment of the axis of said arm member with respect to the axis of said pole piece,
(2) said stem portion of said arm member including laternally extending fins on each side thereof and arranged to be positioned horizontally,
(3) second support members including portions embracing each of said fins,
(a) said portions embracing said fins including air pressure orifices and manifolds within said second support members for supplying air under pressure as a lubricant between said fins and said embracing surfaces,
(4) said cup portion including an electromagnet winding thereon for determining the axial position of said arm member with respect to said pole piece by means of an electromagnetic field generated by current in said winding.

5. A precision positioning device in accordance with claim 4 including
(A) a toroidal pole piece arranged to surround said first pole piece and said winding to form a magnetic air gap between said pole pieces, and
(B) a magnetic structure comprising a closed magnetic circuit connecting and supporting said pole pieces.

6. A positioning system comprising
(A) a unidirectional magnetic structure having a cylindrical pole piece and a toroidal pole surrounding and forming an air gap with said cylindrical pole piece,
(B) an arm member having a cup portion and stem portion,
(1) said cup portion being telescopically positioned over said pole piece within said magnetic air gap with a close clearance fit having a radial dimension in the order of one thousandth of an inch with said pole piece,
(2) said cup portion including an electromagnetic winding for determining axial movements of said arm member upon said pole piece in accordance with a signal current in said winding,
(3) said pole piece including two circumferential rows of compressed air release openings axially spaced near the extremities of the outer surface thereof,
(4) said pole piece including compressed air manifolds arranged for connection to said openings during operation of said system so that the mechanical connection between said cylindrical pole piece and said cup portion consists of a film of air under pressure within a lubrication zone defined by the surfaces having said clearance fit.

7. A positioning system comprising
(A) a magnetic structure for providing a uni-directional magnetic field,
(1) said magnetic structure including a cylindrical pole piece and a toroidal pole piece surrounding and forming an air gap with said cylindrical pole piece,
(B) a centilever arm member having a cup portion and a stem portion extending away from the closed end of said cup portion,
(1) said cup portion of said arm member being telescopically positioned over said cylindrical pole piece and extending through said magnetic air gap,
(2) said cup portion having a clearance fit with said cylindrical pole piece,
(3) said cup portion including an electromagnetic toroidal winding for determining the position of said arm member within the magnetic field of said air gap in accordance with the current in said winding,
(4) said cylindrical pole piece including at least two circumferential rows of compressed air release openings axially spaced along the outer surface thereof,
(a) a source of compressed air arranged for connection to said openings during operation of said system to provide an air-lubricated bearing so that the mechanical connection between said cylindrical pole piece and said cup portion consists of a film of air under pressure.

8. A positioning system comprising
(A) a magnetic structure,
(1) said magnetic structure including a cylindrical pole piece and a toroidal pole piece surrounding and forming an air gap with said cylindrical pole piece,
(B) a centilever arm member having a cup portion and a stem portion extending away from the closed end of said cup portion,
(1) said cup portion of said arm member being telescopically positioned over said cylindrical pole piece and extending through said magnetic air gap,
(2) said cup portion including an electromagnetic winding for determining the position of said arm member within the magnetic field of said air gap,
(3) said cylindrical pole piece including at least two circumferential rows of compressed air release openings axially spaced along the outer surface thereof,
(C) a source of compressed air arranged for connection to said openings during operation of said system so that the mechanical connection between said cylindrical pole piece and said cup portion consists of a film of air under pressure, (D) said stem portion of said arm member including laterally extending fins on said side thereof, (E) fixed support members including surface portions embracing each of said fins and including air pressure openings supplying air under pressure to the associated fin surfaces during operation of said system, (1) said embracing surfaces being arranged in substantially horizontal planes in close proximity to said fins and being operable to support and position the stem portion of said arm member, (a) the connection between said fins and said embracing surfaces of said support member consisting of air pressure films during operation of said system.

References Cited

UNITED STATES PATENTS

| | | | |
|---|---|---|---|
| 3,127,955 | 4/1964 | Macky | 308—5 XR |
| 3,224,255 | 12/1965 | Woods | 73—71.6 |
| 3,312,842 | 4/1967 | Heuchling et al. | 310—90 XR |

OTHER REFERENCES

IBM Technical Disclosure Bulletin, Barcia and Zweig, vol. 5, No. 7, December 1962, pp. 16–17.

MILTON O. HIRSHFIELD, *Primary Examiner.*

D. F. DUGGAN, *Assistant Examiner.*

U.S. Cl. X.R.

308—5